United States Patent Office 3,330,204
Patented July 11, 1967

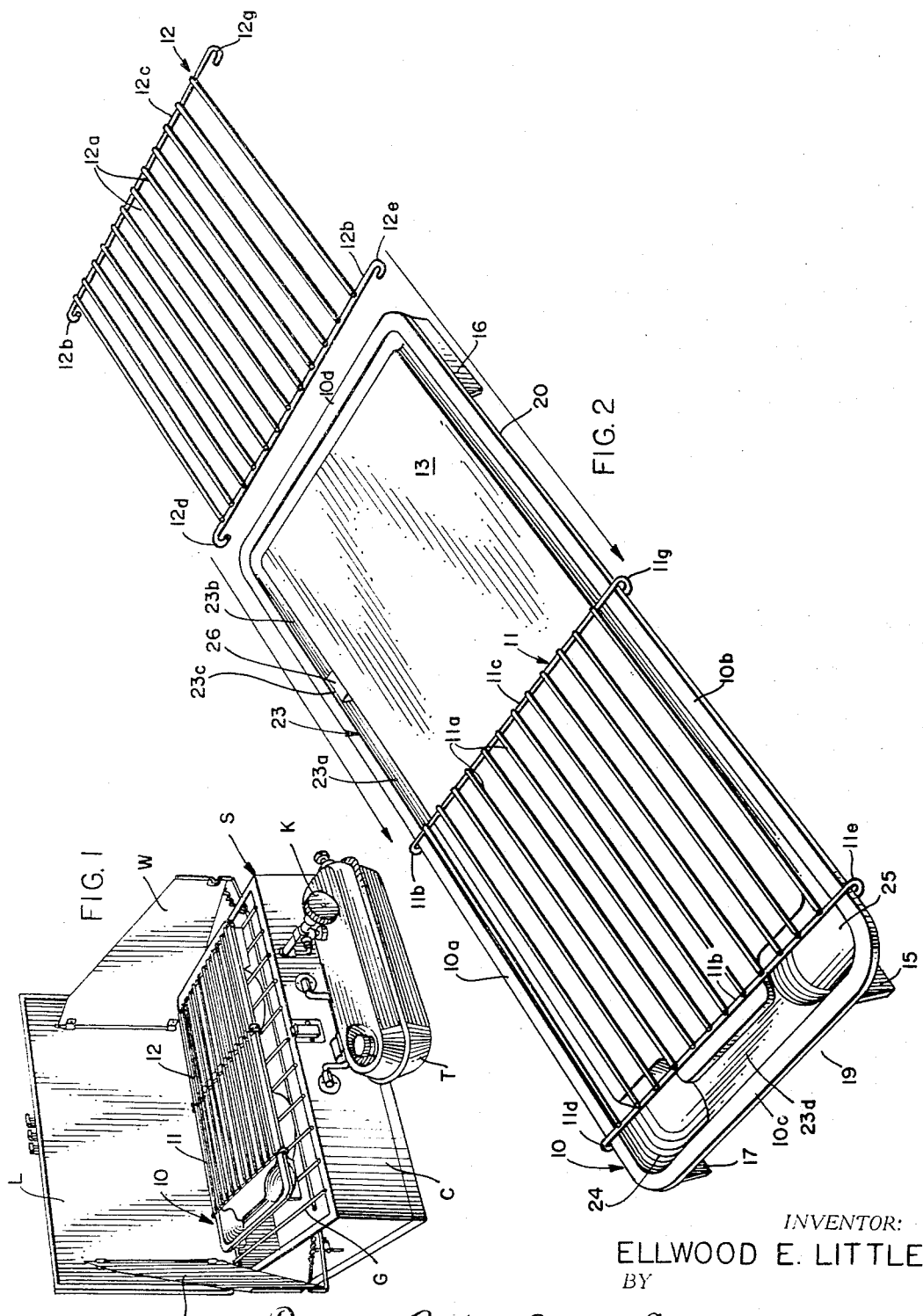

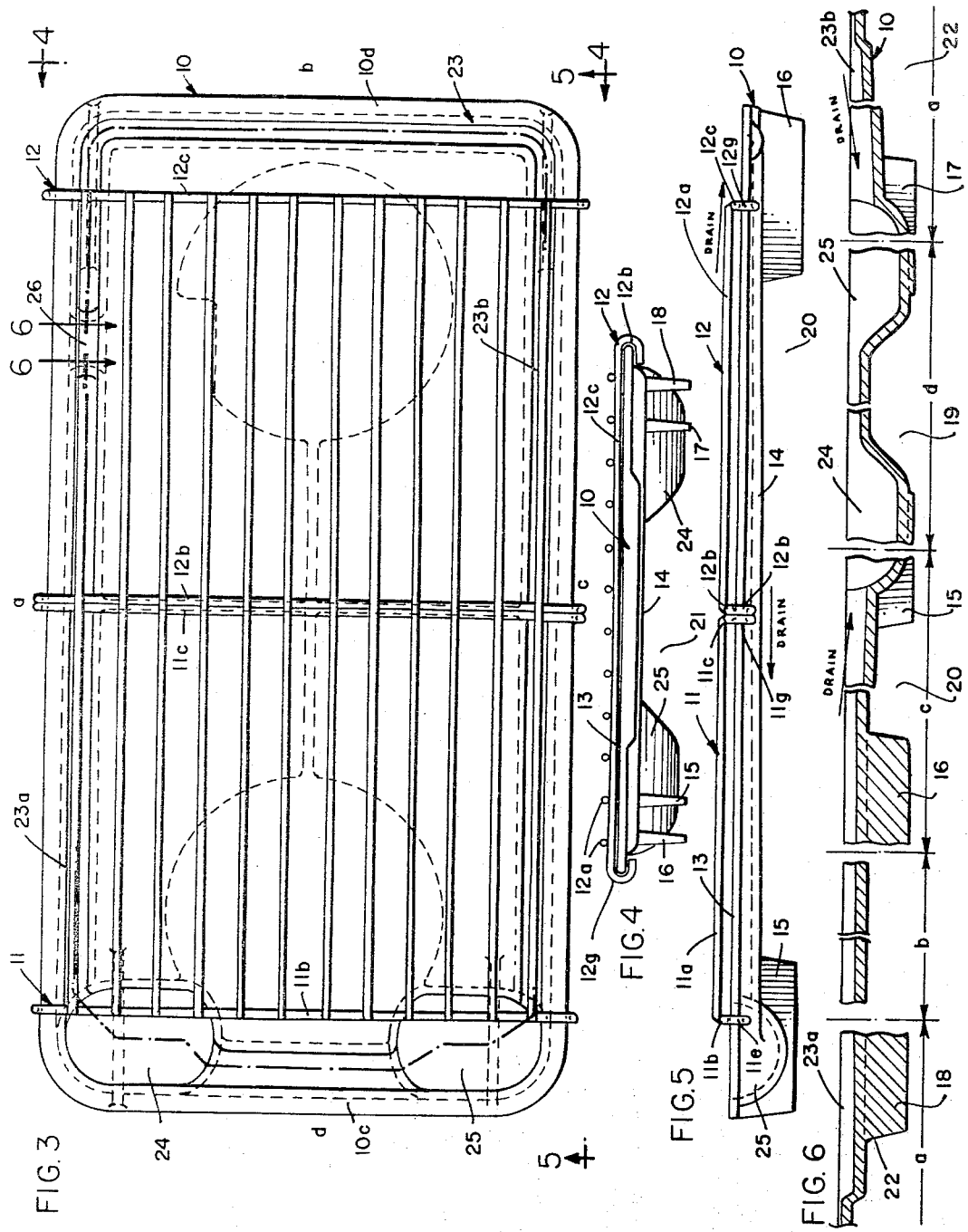

3,330,204
COOKING DEVICE FOR CAMP STOVE
Ellwood E. Little, Wichita, Kans., assignor to The Coleman Company, Inc., Wichita, Kans., a corporation of Kansas
Filed Aug. 6, 1965, Ser. No. 477,877
3 Claims. (Cl. 99—339)

ABSTRACT OF THE DISCLOSURE

A cooking device for a camp stove which includes an elongated, griddle and a pair of food-holding racks. The griddle has a perimetric grease collecting trough which drains into a grease collection sump and a plurality of spaced apart legs for supporting the griddle on the camp stove. The racks are provided with hook means which are slidably received and cooperate with laterally outwardly extending projections of the griddle sides so that each rack may be removed individually from the griddle by longitudinally sliding the rack.

This invention relates to a cooking device for a camp stove, and more particularly to a griddle which may be used either alone or in combination with one or more racks, thereby adapting the cooking device for use in griddle cooking, broiling, or toasting.

Heretofore, no satisfactory cooking device has been available for use on camp stoves which includes a griddle for griddle cooking and racks for broiling or toasting. Further, in many instances, it is desired to toast or broil foods on the camp stove while at the same time cooking other foods on the griddle, and no combination cooking device has been provided which is capable of functioning as a combination toaster-griddle-broiler. For example, in preparing breakfast at a camp site, it will frequently be desirable to cook foods such as bacon, eggs, or both, on a griddle, while at the same time preparing toast. Most campers, however, have only one camp stove available, and therefore a cooking device providing combination toasting and griddle cooking is highly desirable. Similarly, for other camp meals, it may be desirable to broil a meat cut such as steak, while at the same time preparing potatoes or other foods by frying or griddle cooking. It will, therefore, be seen that there has long been a need for a cooking device providing complete versatility of cooking method while utilizing only one camp stove, and permitting toasting or broiling at the same time as griddle cooking.

It is a principal object of the present invention to provide a cooking device for a camp stove which substantially achieves the results and provides the advantages just described. A related object is to provide a cooking device of the character described including a griddle which may be used on a camp stove without interfering with the operation of the burners of the camp stove. Another object is to provide a cooking device including a griddle which includes means for draining the grease from the cooking surface, which means also facilitates the recovery and disposal, or reuse, if desired, of the cooking fat. Still another object is to provide a cooking device including the combination of a griddle and rack where the rack may readily be removed from the griddle while at the same time providing against accidental or unintentional dislodgment of the rack. Further objects and advantages will be indicated in the following detailed specification.

This invention is shown in an illustrative embodiment in the accompanying drawings, in which—

FIGURE 1 is a perspective view showing a combination griddle and rack in cooking position on the top of a typical camp stove;

FIG. 2 is a perspective view of the combination cooking device of FIG. 1, one of the racks being shown in separated relation to indicate the manner in which the rack may be attached and detached from the griddle;

FIG. 3 is a top plan view of the griddle and rack combination of FIG. 2, the configuration of the underside of the griddle being indicated in dotted line;

FIG. 4 is an end view of the griddle and rack combination looking toward the end 4—4 of FIG. 3;

FIG. 5 is a side elevational view looking toward the side 5—5 of FIG. 3; and

FIG. 6 is a composite of fragmentary sectional views taken around the periphery of the griddle through the grease trough and grease sumps, as indicated in FIG. 3, the fragmentary sections being related to the ends and sides of the griddle of FIG. 3 by the letters a, b, c, and d.

Looking first at FIGURE 1, theer is shown a griddle designated generally by the number 10, equipped with racks 11 and 12, the griddle 10 being supported on the grate G of a typical two-burner camp stove S, which includes the usual gas tank T, control knob K, lid L, and wind deflectors W. With camp stoves of the kind indicated, which include a case C within which the burners (not shown) are mounted, the combustion air for the burners must enter through the grate G. Where a cooking device such as the one shown is provided substantially covering the top of the grate G, there can be a serious problem in reducing or interfering with the flow of combustion air to the burners. This problem is overcome by the present invention, which at the same time provides other advantages, as will subsequently be described in greater detail.

The griddle 10 is preferably in the form of an elongated casting. An aluminum casting is preferred, but cast iron can also be used. As shown in FIG. 2, the griddle provides a horizontally-extending top cooking surface 13, and also provides a horizontally-extending underside 14 for receiving heat from the camp stove, as shown more clearly in FIGS. 4 and 5.

In accordance with the present invention, griddle 10 is provided with a plurality of legs 15, 16, 17, and 18, as shown in FIGS. 2, 4 and 5, which extend downwardly from the peripheral portions of the underside 14 for supporting the griddle on the grate of a camp stove, such as the grate G of stove S (FIG. 1), the legs 15, 16, 17, and 18 are spaced apart to provide a plurality of entry spaces, such as the spaces 19, 20 (FIGS. 2 and 5), 21 (FIG. 4), and 22 (FIG. 6).

The legs 15, 16, 17, and 18 are dimensioned to support the underside 14 in spaced relation to the grate to permit air from surrounding atmosphere to flow through the air entry spaces 19, 20, 21, 22, and under the griddle. In the illustration given, the griddle underside 14 and the cooking surface 13 are of generally rectangular configuration, and one of the legs 15, 16, 17, and 18 is provided at each of the four corners of the underside. Where additional legs are provided, it is preferred to use the minimum number of legs and to employ a spacing and arrangement which facilitates the desired circulation of air to the burners of the camp stove.

Griddle 10 is also provided with a grease collection trough designated generally by the number 23, which extends around the periphery of the top cooking surface 13, as shown particularly in FIGS. 2 and 3. The griddle 10 also provides at least one grease collection sump in drainage relation with trough 23. In the illustration given, two grease collection sumps 24 and 25 are provided, and the grease trough is divided into two drainage portions 23a and 23b. As shown, drainage portion 23a communicates with and is in drainage relation with sump 24, while portion 23b communicates with and is in drainage relation with sump 25. As shown more clearly in FIGS. 4 and 5, the sumps 25 and 26 extend downwardly below the underside 14 of the griddle. The downward extension of the sumps is facilitated by the downward extension of the legs, and preferably, as shown, the legs 15, 16, 17, and 18 extend downwardly a little further than the sumps 24 and 25. In the illustration given, sumps 24 and 25 are located at adjacent corners of the cooking surface 13, and the legs 15 and 17, which are at the same adjacent corners of the cooking surface, extend downwardly and outwardly from the portions of the underside of the griddle immediately below the sumps, as shown more clearly in FIGS. 5 and 6. By combining the sumps, 24 and 25 respectively with the legs 15 and 17, as shown, minimum interference is provided with the flow of air to the burners of the stove.

It will be understood that the drainage portion 23a is pitched or sloped to provide drainage to the sump 24, while the trough portion 24b is pitched to provide drainage to the sump 25. While grease trough portions 23a and 23b may be in communication, it is preferred to provide a dam or raised portion 26 between the adjacent ends thereof, as shown in FIGS. 2 and 3. The slope of the respective portions 23a and 23b is indicated more clearly in FIG. 6, where the direction of drainage is also indicated by arrows. In the illustration given, a sump portion 23c is provided immediately above dam 26, permitting grease to overflow from sump portion 23a to 23b, or vice versa, before grease overflows from these portions onto the cooking surface 13 or over the sides or ends of the griddle. A trough portion 23d is also provided between sumps 24 and 25, permitting an excess of grease to flow between the sumps before the sumps cause grease to overflow onto the cooking surface 13 or over the adjacent sides or end portions of the griddle.

As previously indicated, the griddle 10 is preferably employed in combination with toaster-broiler racks, such as the racks 11 and 12. At least one, and preferably two, racks are provided. As shown in FIG. 2, the racks extend horizontally and provide longitudinally-extending, food-holding rods 11a and 12a which are spaced apart and supported in close relation to cooking surface 13. The relation of the food-holding rods 11a and 12a to the surface 13 is shown more clearly in FIGS. 4 and 5. In the illustration given, two longitudinally-spaced, laterally-extending support rods 11b, 11c and 12b, 12c extend from the portions of the respective racks 11, 12 which rest on the cooking surface 13, as shown more clearly in FIGS. 4 and 5. The food-holding rods 11a, 12a extend longitudinally respectively between the support rods 11b, 11c and 12b, 12c. The ends of the food-holding rods are rigidly connected to the tops of the support rods by suitable means such as welding. The racks 11 and 12 may therefore be conveniently constructed of a a suitable wire or rod stock, such as steel wire or rods, and the racks may be coated with a protective coating, such as a chrome coating.

In accordance with the present invention, the racks 11 and 12 are slidable longitudinally on cooking surface 13, and include hook means 11d, 11e, 11f, and 11g for the rack 11, and hook means 12d, 12e, 12f, and 12g for rack 12, which slidably engage the longitudinal sides 10a and 10b of the griddle for restraining the racks from shifting laterally on cooking surface 13, while being removable by longitudinal sliding. The procedure for attaching and detaching the racks is indicated in FIG. 2, where the rack 12 is shown in separated relation, the arrows indicating the direction of movement for sliding the hooks 12d, 12f and 12e, 12g, respectively, over the side edge portions 10a and 10b. In the preferred construction as shown more clearly in FIG. 4, the longitudinal side edges 10a and 10b project laterally outwardly beyond the legs 15, 16, 17, and 18, and provide sliding surfaces or tracks for cooperating with the hook means of the racks. While various hook means may be provided, the one illustrated in the drawings is simple and economical. The hooks are formed by reverse bends in the outer end portions of the support rods, the hooks 10d and 10e being formed by reverse bends in the outer end portion of the support rod 11d, etc. Preferably, as shown more clearly in FIG. 4, the hooks extend under the side edge portions, thereby preventing the racks from being lifted vertically or shifting laterally with respect to the cooking surface 13.

Operation

The operation of the griddle and rack combination of this invention will be largely apparent from the foregoing description. However, it may be briefly summarized as follows:

The griddle 10 may be used with one or both of the racks 11 and 12. Where the entire cooking device is to be used for broiling or toasting, both the racks 11 and 12 will be in place, as shown in FIGS. 1 and 3. Alternatively, both racks may be removed, and the griddle surface 13 employed for griddle cooking or frying. A further alternative is to employ the unit with only one of the racks thereon, for example, the rack 11, as shown in FIG. 2. Foods may be toasted or broiled on the rack 11 while the exposed portion of the cooking surface 13 is simultaneously employed for griddle cooking. Grease from either the broiling food on the racks or from food being cooked on the surface 13 will flow to the trough portions 23a and 23b and then respectively into the sumps 24 and 25. The sumps have a rounded or concave configuration so that a spoon may be easily inserted in the sumps to permit the removal of grease for disposal or use in basting foods being cooked on the racks or cooking surface. During the use of the griddle or griddle-rack combination in any of the alternative manners described, air can continue to circulate to the stove burners in the manner previously described.

While in the foregoing specification this invention has been described in relation to a specific embodiment thereof, and many details have been set forth for purpose of illustration, it will be apparent to those skilled in the art that the invention is susceptible to additional embodiments and that certain of the details described herein can be varied considerably without departing from the basic principles of the invention.

I claim:
1. In a cooking device for a camp stove, the combination of:
  (a) an elongated griddle of rectangular configuration providing a horizontally-extending top cooking surface and a horizontally-extending underside for receiving heat from the camp stove, said griddle having a plurality of legs extending downwardly from the peripheral portions of the underside thereof for supporting said griddle on the grate of the camp stove, said legs being spaced apart to provide a plurality of air entry spaces around the periphery of said griddle and being dimensioned to support the underside of said griddle in spaced relation to said grate to permit air from the surrounding atmosphere to flow through said air entry spaces and under said griddle,
    said griddle also having a grease collection trough extending around the periphery of said top cooking surface and providing at least one grease collection sump in drainage relation with said trough,
    said sump extending downwardly below the underside of said griddle; and
  (b) a pair of horizontally-extending racks providing food-holding rods spaced apart and supported in close relation to said cooking surface, said racks including laterally outwardly extending hook means, the longitudinal sides of said griddle extending laterally outwardly beyond said legs for slidably receiving and cooperating with said hook means for retaining said racks from slipping laterally while permitting individual removal of said racks from said griddle by longitudinal sliding of said racks.

2. The cooking device of claim 1 wherein each of said racks include a pair of longitudinally speced, laterally extending support rods which rest on said cooking surface, said food-holding rods being laterally spaced and extending longitudinally between said support rods and being rigidly connected thereto, the outer ends of said support rods providing said hook means.

3. The cooking device of claim 2 wherein said hook means are provided by reverse bends in the outer ends of said support rods.

References Cited

UNITED STATES PATENTS

| | | | |
|---|---|---|---|
| D. 155,854 | 11/1949 | Weglage. | |
| 583,063 | 5/1897 | Martinie | 99—450 X |
| 1,169,168 | 1/1916 | Lane et al. | 99—446 |
| 1,889,218 | 11/1932 | Reedy. | |
| 1,961,391 | 6/1934 | Reedy et al. | 99—446 |
| 1,988,871 | 1/1935 | Kennedy et al. | 99—425 |
| 2,411,993 | 12/1946 | Hobson | 99—446 X |
| 2,816,538 | 12/1957 | Miller et al. | 99—444 X |

FOREIGN PATENTS 700,847  1/1931  France.

WALTER A. SCHEEL, *Primary Examiner.*

S. P. FISCHER, *Assistant Examiner.*